United States Patent
Roethig et al.

(10) Patent No.: US 6,625,781 B2
(45) Date of Patent: Sep. 23, 2003

(54) MULTI-LEVEL POWER MACROMODELING

(75) Inventors: Wolfgang Roethig, San Jose, CA (US); Ganesh Lakshminarayana, Plainsboro, NJ (US); Anand Raghunathan, Plainsboro, NJ (US); Arun Balakrishnan, Santa Clara, CA (US)

(73) Assignee: NEC Electronics, Inc., Santa Clara, CA (US)

( * ) Notice: Subject to any disclaimer, the term of this patent is extended or adjusted under 35 U.S.C. 154(b) by 163 days.

(21) Appl. No.: 09/771,100

(22) Filed: Jan. 26, 2001

(65) Prior Publication Data

US 2002/0138809 A1 Sep. 26, 2002

(51) Int. Cl.$^7$ .............................................. G06F 17/50
(52) U.S. Cl. ........................ 716/1; 716/4; 716/5; 716/17
(58) Field of Search ............................... 716/1, 4, 5, 17

(56) References Cited

U.S. PATENT DOCUMENTS 4,698,760 A * 10/1987 Lembach et al. ............. 716/6
5,598,344 A * 1/1997 Dangelo et al. ............. 716/18

* cited by examiner

Primary Examiner—Leigh M. Garbowski
Assistant Examiner—Brandon Bowers
(74) Attorney, Agent, or Firm—Skjerven Morrill LLP

(57) ABSTRACT

The invention utilizes the linear complexity of orthogonal vectors to reduce the number of equations (or variables) to be solved. The present invention constructs a power model of a set of combinations of states without considering irrelevant combinations. The invention distinguishes between the switching direction on the input and the output pin. The invention considers state-dependency as a function of power consumed and depending on the paths through internal nodes. The model considers switching input pins that do not cause the output pin to switch to overcome inaccuracies caused by combining the power pin model with the state and arc power model with state. The model considers switching input pins that cause the output pin to switch. For cells in which the slewrate propagation effect from input to output is negligible, the invention uses a model of 2 power pins with state. The invention also determines the validity of this model. The present invention also models a power arc from one input pin to multiple output pins.

5 Claims, 2 Drawing Sheets

MULTI-LEVEL POWER MACROMODELING

BACKGROUND OF THE INVENTION

1. Field of the Invention

The present invention relates to a model for power consumption for electrical circuits, specifically a CMOS macrocell.

2. Description of the Related Art

The power consumption of a macrocell is calculated based on the switching activity of the individual boundary pins. The power consumption of the macrocell is calculated as the sum of the product between switching activity and power coefficient for the individual pins. The individual power coefficient captures technology-specific data and environment conditions, such as voltage, temperature, load capacitance for output pins. The individual power coefficient captures technology-specific data including the slewrate for input pins. With this technique, the power consumption of a macrocell with N pins can be modeled with N power coefficients. The only data required is provided by observing or estimating the switching activity on each net of the design.

Characterization of the power coefficients based on switching activity alone does not support accurate power modeling, even for small cells. The power coefficient of the output pin captures the effect of load capacitance. The respective power coefficients for input pins must capture the effect of the respective slewrates. However, a switching signal on an input pin will have only a noticeable power consumption effect, if the output is switching which leads to incorrect results. The correct this inaccuracy, the invention considers the slewrate on the input pins when calculating the power coefficient for the output pins.

For small cells the load effects are much more dominant on power consumption than the slewrate effects. Therefore, modeling with power coefficients only for output pins is an improvement for small cells. But for larger cells, a greater percentage of the power is consumed internally. One way of accounting for internal power for large and small cells is to observe both primary output pins and internal output pins. The difficulty is to decide which internal pins are most relevant for power consumption. Observing all internal pins would actually defeat the purpose of macromodeling because one would have merely a collection of models for the constituent components of the macrocell. A collection of models for the constituent components of a macrocell provides an adequate model of certain cells, such as a flipflop but not for the majority of macrocells.

Considering state dependency improves the accuracy of the power pin model. The switching activity for each pin as well as the state of other pins is determined. Instead of one power coefficient per pin, the model uses multiple power coefficients per pin. The model uses the relevant states on other pins to determine the number of power coefficients required for each pin. State-dependency provides a power pin model applicable to all cells, not only flip flops.

For pins with state dependency, the number of rising edges is not necessarily equal to the number of falling edges. Therefore, for pins with state dependency, it is necessary to determine which signals on which pins are rising and which signals are falling. While the total number of rising and falling edges on a signal is the same in a repeatable scenario, particular rising and falling edges may occur in different logic states of the circuit. For example, all rising edges could occur while the circuit is in state A whereas all falling edges occur while the circuit is in state B. The circuit may have different power consumption for rising edge during state A, falling edge during state A, rising edge during state B and falling edge during state B. Therefore, we need to distinguish between rising and falling edges during each state.

The number of permutations of rising and falling pins increases with the size of the cell. The relationship increases exponentially, N pins have 2N possible states. The present invention collapses some states in order to reduce the complexity. Prior art approaches may combine certain states if the power consumption between those states is similar. However, exhaustive characterization of all states is needed before reducing the number of states. Simultaneously switching pins also increases the number of power coefficients.

But collapsing states requires starting with a large number of permutations. When characterizing the power consumption of all possible states exhaustively, certain states may be found to have negligible power consumption. Those states can be reduced from the power model. Again, exhaustive characterization is required.

The dependency between slewrate of the input pin and the load capacitance of the outpin cannot be accurately modeled by a one-dimensional function for slewrate attached to the input and one-dimensional function for the load capacitance. A need exists for a model with two dimensions, or more.

SUMMARY OF THE INVENTION

The invention utilizes the linear complexity of orthogonal vectors to reduce the number of equations (or variables) to be solved. The present invention constructs a power model of a set of combinations of states without considering irrelevant combinations. The invention distinguishes between the switching direction on the input and the output pin. The invention considers state-dependency as a function of power consumed and depending on the paths through internal nodes. The model considers switching input pins that do not cause the output pin to switch to overcome inaccuracies caused by combining the power pin model with the state and arc power model with state. The model considers switching input pins that cause the output pin to switch. For cells in which the slewrate propagation effect from input to output is negligible, the invention uses a model of 2 power pins with state. The invention also determines the validity of this model. The present invention also models a power arc from one input pin to multiple output pins.

The foregoing is a summary and this contains, by necessity, simplifications, generalizations and omissions of detail; consequently, those skilled in the art will appreciate that the summary is illustrative only and is not intended to be in any way limiting.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF THE DRAWINGS

Figure 1:
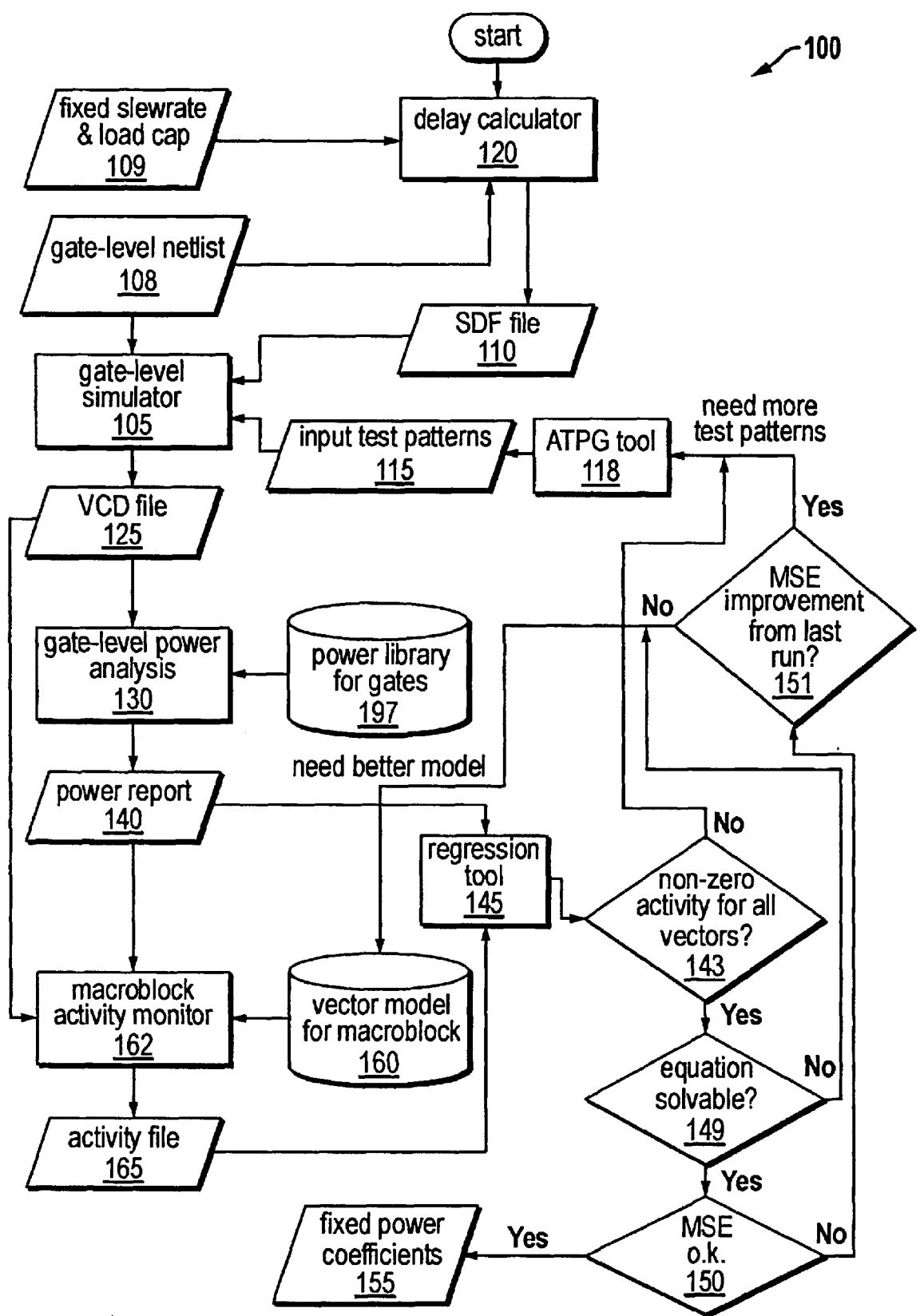
FIG. 1 is a flow diagram depicting estimating the power with a constant set of environmental conditions (slewrate and load).

The following examples set for a detailed description of modes for carrying out the invention. The descriptions are illustrative of the invention and should not be taken to be limiting.

Vectors are used in the invention to describe every relevant state, event and sequence of events at the boundary of a cell. Specifically, vectors are used to describe: a single event, a single event with conditions, simultaneously occurring events, cause and effect and a sequence of two or more related events. Vectors are used to describe simultaneously occurring events with or without state. As previously mentioned, vectors are used to describe a sequence of cause and effect, with or without state. Finally, vectors are used to describe a sequence of two or more related events, with or without state.

The number of pins involved in a particular vector is not restricted, therefore, the number of variables in the power model is not restricted. For example, if a particular vector describes a sequence of events involving 2 input pins and 3 output pins, the power model may depend on 2 slewrate and 3 load capacitance values.

The vector power modeling approach does not impose a particular modeling style nor require exhaustive enumeration of all possible combinations within the chosen modeling style. Ideally, one would chose a set of orthogonal vectors for power characterization. This does not mean a set of mutually exclusive vectors. The set of vectors is orthogonal and complete, since each vector can be associated with a different set of power consumption components, where the intersection between each set is empty and the union of all set adds up to the total power consumption. This criterion can be used as a definition for orthogonal power vectors. However, if the data input switches multiple times during a clock cycle, then the power consumption in the master stage depends on the state of the clock pin, and more vectors as needed to define the model.

The power model consists of orthogonal and mutually exclusive vectors. One subset of vectors may be orthogonal to another subset of vectors. The vectors within a subset may be mutually exclusive with respect to each other. One set of vectors, models the power consumption of the path from input to output. A second set of vectors models the power consumption of the input buffer. A third set of vectors consists only of mutually exclusive vectors.

Orthogonal vectors are linearly complex, the number of vectors is always smaller or equal to the number of components with the independent power consumption, into which a complex cell can be divided. In comparison, the number of mutually exclusive vectors is exponential with respect to the variables involved in the vector description.

The invention considers the accuracy of the model against the efficiency. If the model finds the set of vectors used has created an efficient but inaccurate model, the model adjusts the set of vectors to create a more accurate model. To measure the accuracy of the power model while retaining an efficient model, the invention characterizes the power vectors using the technique as described in High-Level Power Analysis and Optimization, by Anand Raghunathan, et al. which is hereby incorporated by reference, in its entirety, for all purposes.

To characterize the power vector for a cell, a target model involving N power coefficients is chosen. The goal is to extract the power coefficients while subjecting the cell to randomly generated stimuli. The power consumption for the stimulated cell is measured using a lower level model. For example, if the target model is at gate-level, the reference model is at transistor-level. If the target model is a logic-building-block level, the reference model may be at gate-level or at transistor-level. For each power measurement, the occurrence frequency or switching activity of each vector is extracted. The power characterization results can be described by the following set of equations.

$$\sum_{i=1}^{N} act_i(K) \cdot pc_i = power(K) \quad \text{(Equation 1)}$$

$$1 \leq K \leq M$$

where
- M is the number of measurements taken within subsequent time intervals (e.g. subsequent clock cycles)
- K is the measurement taken within time interval K
- N is the number of vector-specific power coefficients chosen for the model
- $pc_i$ is the ith power coefficient, $1<=i<=N$
  - $act_i(K)$ denotes the measured activity of the ith vector during time interval K, is the ith vector being associated with the ith power coefficient $pc_i$
- power
- (K) is the measured power consumption during time interval K In an exact approach, the number of measurements M could be chosen to be equal to the number of power coefficients N. This would allow to calculate the N unknown power coefficients from a set of N equations. However, the set of equations is not necessarily singular. Therefore, a more general approach is chosen which minimizes the Mean-Square-Error (the error, or MSE) between the measured power and the power calculated by the model.

This set of equations can be solved for the N power coefficients. Then the error can be calculated as a measure of quality. More stimuli and power measurements can be performed, until the error stabilizes. The stabilized value of the error is a criterion for the quality of the power model. If the set of chosen power vectors was orthogonal and complete, the error is zero.

$$MSE = \sum_{K=1}^{M} \sum_{i=1}^{N} (act_i(K) \cdot pc_i - power(K))^2 = \min \quad \text{(Equation 2)}$$

where
- MSE is the defined mean square error
- All other symbols are explained in Equation 1

The characterization goal is to find a set of power coefficients that minimize MSE. Therefore the partial derivative of MSE for each power coefficient must be zero.

$$\partial MSE / \partial pc_i = \quad \text{(Equation 3)}$$

$$\sum_{K=1}^{M} act_i(K) \cdot 2 \cdot \left( \sum_{j=1}^{N} act_j(K) \cdot pc_j - power(K) \right) = 0$$

$$1 \leq i \leq N$$

As previously discussed, the model calculates power measurements for fixed slewrate and load. However, once the set of power vectors is chosen, the corresponding power coefficients must be characterized for slewrate- and load-dependency. For each vector under characterization, a stimulus must be chosen which exhibits at least one occurrence of this vector. Power measurements for this stimulus are then performed by sweeping the slewrate and load values for this vector through the characterization range.

The varied slewrate or load capacitance affects only one vector within the stimulus. Therefore the slewrate- and load-dependent power coefficient can be extracted from the total power measured for the stimulus by subtracting the known power contributions from the other vectors. The method is not restricted to constant power coefficients. A power coefficient can be indeed a multidimensional table, e.g. a 2-dimensional table with slewrate and load capacitance as arguments. This will merely augment the number of equations by the number of datapoints chosen for the table. Also, instead of using multidimensional tables, a set of 1-dimensional tables can be chosen, by applying orthogonal decomposition of the arguments.

That is, for example $$pc_i = pc_i'(slew) + pc_i''(load) \quad \text{(Equation 4a)}$$

instead of $$pc_i = pc_i(slew, load) \quad \text{(Equation 4b)}$$

For instance, if 3 datapoints are chosen for slew and 5 datapoints are chosen for load, the model with orthogonal decomposition requires 3+5=8 datapoints, whereas the 2-dimensional model requires 3*5=15 datapoints.

The situation with only one characterization variable per vector is a special case. In cases with more than two characterization variables (e.g. slewrate on input pin, load capacitance on two output pins) the model expresses the power coefficient involving all variables as a sum of power coefficients involving less variables. Starting with a stimulus exhibiting known switching activity and known power coefficients for a set of involved vectors the invention applies the MSE method (described previously) to determine the accuracy of the invention versus the efficiency, again decreasing the efficiency if necessary to increase the accuracy.

FIG. 1 shows the flow diagram for the power characterization method described in this invention. Gate-level simulator 105 is used as basic characterization engine. Gate level simulator 105 requires the following inputs: a gate-level netlist of the macroblock 108, timing information for the gates 110 and a test pattern file describing the primary input waveforms applied to the macroblock 115.

SDF file 110 is generated by delay calculator 120. Gate-level netlist 108 and slewrate and load capacitance 109 are inputs to gate-level netlist 108. Not shown are environmental conditions, such as process, voltage, temperature. However, such environmental conditions can be an input to delay calculator 120 by data file 109.

Automatic Test Pattern Generation (ATPG) tool 118 generates input patterns 115 such that a maximum number of gates within the macroblock will switch during the simulation. Gate-level simulator 105 calculates Value Change Dump (VCD) file 125 that contains a simulation of all events observed at the nodes inside the macroblock. ALF library 197 contains power models of each gate contained in the macroblock. ALF library 197 and VCD file 125, gate-level netlist 108 and slew rate and load capacitance file 109 are inputs to the gate-level power analysis tool 130. Power analysis tool 130 generates power report 140 containing the calculated power consumption of the macroblock per time interval, denoted power(K), as defined in equation 1.

VCD file 125 serves as input to the macroblock activity monitor 162. Activity monitor 162 accounts for the activation of each power vector defined in the power model for the macroblock. The associated power coefficients pci remain to be calculated.) Activity monitor 162 generates activity file 165. Activity file 165 contains the switching activity for power vectors of the macroblock, acti(K). Equation 1 defines pci and acti(K).

Regression tool 145 solves the system of equations 3 for pci, based on acti(K) from the activity file and power(K) from the power report. Decision 150 evaluates the accuracy of regression tool 145. If acti(K)=0 for any given power vector, the equation system can not be solved, and more input test patterns are required. Decision 150 calculates the MSE, which is a measure for accuracy of the extracted power model. If the MSE is not satisfactory, decision 150 returns the process to the ALF model for macroblock 160 to define an improved set of power vectors. Decision 151 returns the process to ATPG tool 118 if more input test patterns are required. If the system of equations can be solved, which implies that all acti(K) are non-zero, and the MSE is satisfactory, the calculated fixed power coefficients pci are stored for further usage 155.

After solving system of equations 3, if improved accuracy is required, the process sweeps slewrate and load capacitance values through the characterization range, according to equation 4a and 4b. Gate-level power analysis 130 is calculated again. Considering orthogonality between slewrate and load capacitance, as expressed in equation 4a, the power analysis (4) can be performed using the original vcd file 125 rather than doing delay calculation 120, gate-level simulation 105 and macroblock activity monitoring 162 again.

The goal of the characterization as performed in the process depicted in FIG. 1, is to collect data points for the power coefficients for as many environmental conditions (i.e. slewrate and load) as necessary to facilitate power analysis for all these environmental conditions. The validity of the vector model and test pattern are determined for an arbitrary set of environmental conditions, 143. The process next confirms that equation 3 is solvable with the data points calculated for the environmental conditions selected, 149. The final step in confirming the validity of the environmental conditions is to calculate the MSE and determined that it is within acceptable limits. 150.

Once the validity of the environmental conditions used in FIG. 1 is validated feedback loops to ATPG tool 118 and to the macroblock power model 160 are no longer necessary. Although the simulation results would be different, the differences in the activity file, which is output of 165, would be negligible. This assumption is true in particular for large macroblocks, which are the primary target for this characterization methodology.

Figure 2:
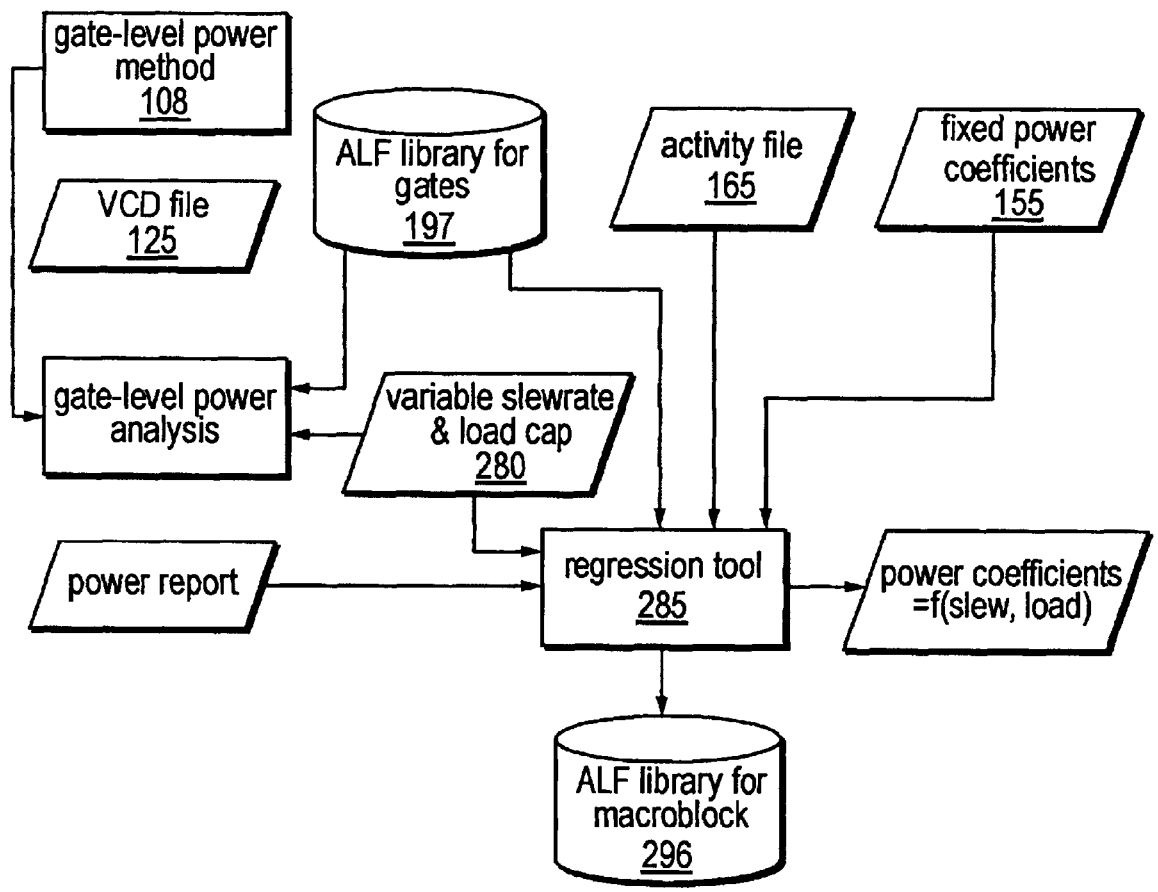
FIG. 2 is a flow diagram depicting estimating the power of a circuit with variable environmental conditions.

Referring now to FIG. 2, regression tool 285 solves the system of equations 3 again for pci, which are now slewrate and load dependent. Slewrate and load are read from data file 280. The acti(K) on the left hand side of the equation are the same as in the first run. Only the power consumption results power(K) on the right side are different, due to the variable slewrate and load. The result is power library 296, which associates the power vectors in the model with the power coefficients.

After the power consumption for the macrocell has been characterized, these values can be combined to estimate the power consumption for a larger collection of macrocells. The process may be used to develop a library of macroblocks with known power consumption. The library may be used to select a macroblock with the least power consumption for a particular purpose. Also, the library may be used to change physical placement of macroblocks in a design such so that a concentration of macroblocks with high power consumption are distributed evenly. In this manner, concentrations of macroblocks with high power consumption ("hot spots") are avoided.

While particular embodiments of the present invention have been shown and described, it will be obvious to those skilled in the art that, based upon the teachings herein, changes and modifications may be made without departing from this invention and its broader aspects, and therefore, the appended claims are to encompass within their scope all such changes and modifications as are within the true spirit and scope of this invention. Furthermore, it is to be understood that the invention is solely defined by the appended claims.

What is claimed is:

1. A method for designing a circuit, comprising:

estimating the power consumed by the circuit; and increasing the accuracy of the estimate of the power consumed by an automated iterative mathematical process, wherein the automated iterative mathematical process comprises calculating at least one power coefficient for the circuit as a function of (1) an estimated power vector switching activity and (2) a calculated power consumption per time interval.

2. An integrated circuit, comprising the circuit being designed by estimating the power consumed by the circuit and increasing the accuracy of the estimate of the power consumed by an automated iterative mathematical process, wherein the automated iterative mathematical process comprises calculating at least one power coefficient for the circuit as a function of (1) an estimated power vector switching activity and (2) a calculated power consumption per time interval.

3. The integrated circuit of claim 2, wherein the circuit is designed using vectors to model the activity of pins in a macrocell.

4. A method for designing a circuit, comprising:

estimating the power consumed by the circuit using vectors;

calculating the accuracy of the estimate of the power estimated, and iterating the estimate of the power consumed;

wherein iterating the estimate of the power consumed comprises calculating at least one power coefficient for the circuit as a function of (1) an estimated power vector switching activity and (2) a calculated power consumption per time interval.

5. A computer program produce encoded in computer readable media, the computer program product comprising:

a first set of instructions, executable on a computer system, configured to use vectors to estimate the power consumed by a macrocell; and a second set of instructions, executable on a computer program, configured to iterate the estimate of the power consumed by the macrocell;

wherein iterating the estimate of the power consumed comprises calculating at least one power coefficient for the circuit as a function of (1) an estimated power vector switching activity and (2) a calculated power consumption per time interval.

* * * * *